United States Patent [19]
Crookston et al.

[11] 4,006,332
[45] Feb. 1, 1977

[54] CONVECTION HEATING APPARATUS FOR MULTI-PHASE GAS-TYPE CIRCUIT INTERRUPTERS

[75] Inventors: Ronald W. Crookston, Trafford, Pa.; Thomas E. Alverson, Brookfield, Ohio; Otto H. Soles, North Huntington, Pa.

[73] Assignee: Westinghouse Electric Corporation, Pittsburgh, Pa.

[22] Filed: Nov. 11, 1974

[21] Appl. No.: 522,960

[52] U.S. Cl. .................. 200/148 E; 200/148 R
[51] Int. Cl.² ................ H01H 33/54; H01H 33/70
[58] Field of Search ............ 200/144 R, 145, 148; 174/14 R

[56] References Cited
UNITED STATES PATENTS

| | | | |
|---|---|---|---|
| 2,257,897 | 10/1941 | Zenner et al. | 200/148 E X |
| 2,955,182 | 10/1960 | Caswell et al. | 200/148 E |
| 3,118,995 | 1/1964 | Colclaser, Jr. et al. | 200/148 R |
| 3,137,777 | 6/1964 | Yeckley et al. | 200/148 R |
| 3,303,310 | 2/1967 | McKeough et al. | 200/148 B |
| 3,358,104 | 12/1967 | Cromer et al. | 200/148 R |
| 3,359,390 | 12/1967 | Frowein | 200/148 E |
| 3,532,843 | 10/1970 | Pucher | 200/145 X |
| 3,566,062 | 2/1971 | Meier et al. | 200/148 E |
| 3,846,601 | 11/1974 | Leeds | 200/145 X |
| 3,889,084 | 6/1975 | Kucharski | 200/148 R |

FOREIGN PATENTS OR APPLICATIONS

| | | | |
|---|---|---|---|
| 1,229,036 | 4/1971 | United Kingdom | 200/148 E |

Primary Examiner—James R. Scott
Attorney, Agent, or Firm—W. R. Crout

[57] ABSTRACT

An improved gas-heating means is provided for a multi-phase gas-type circuit-interrupter, all phases being supplied with high-pressure gas from a single high-pressure reservoir tank by suitable baffling means spaced longitudinally along the high-pressure reservoir tank, together with hot and cold inlet and outlet pipes leading into the separate upstanding circuit-breaker columns, or modules, controlling the individual phases, with the cold outlet pipe, preferably, extending downwardly toward the lower end of the high-pressure reservoir tank, and the hot inlet pipe located, preferably, at a higher elevational level than the cold outlet pipe, for thereby promoting proper heated gas circulation into the upstanding circuit-breaker modules.

7 Claims, 15 Drawing Figures

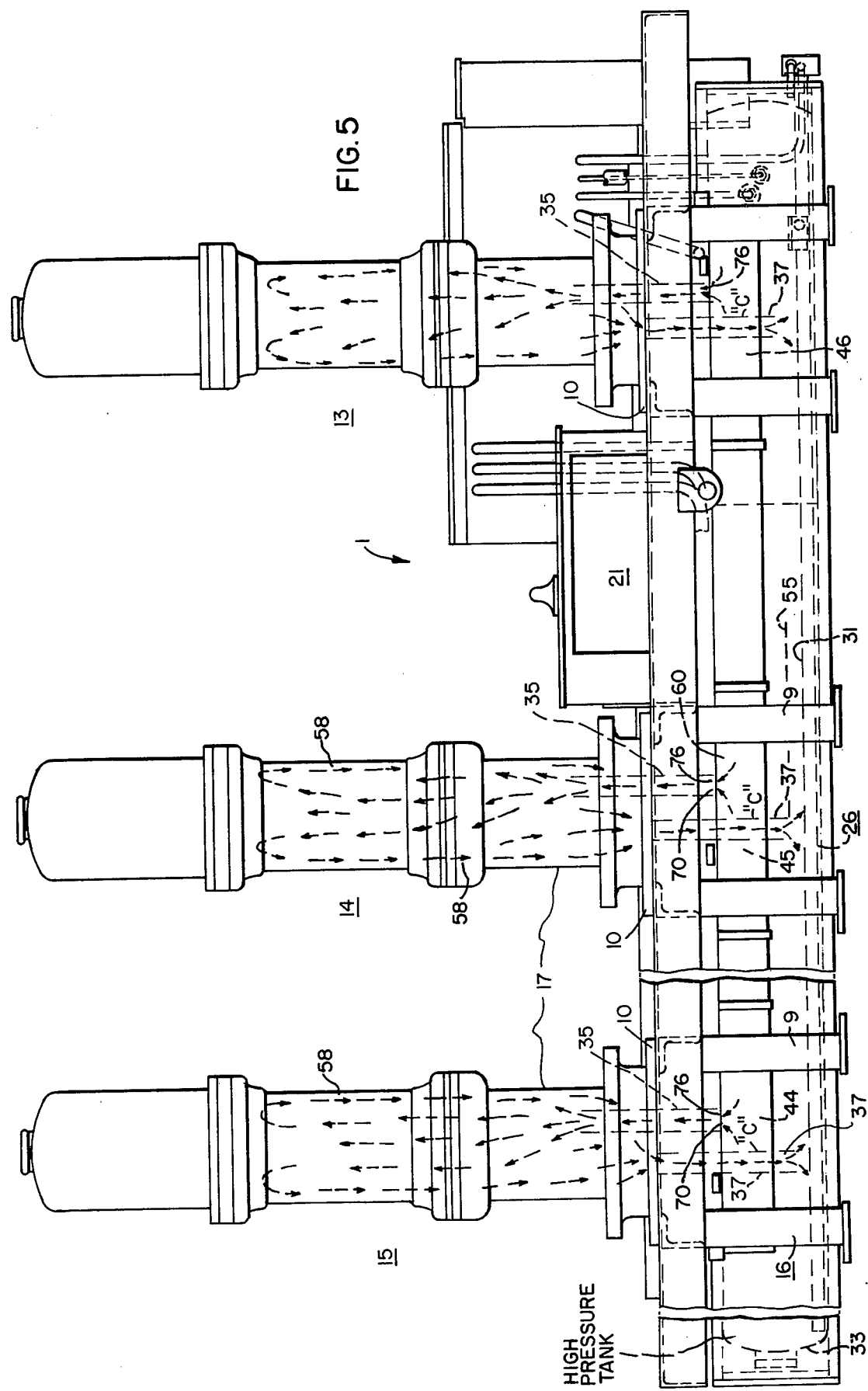

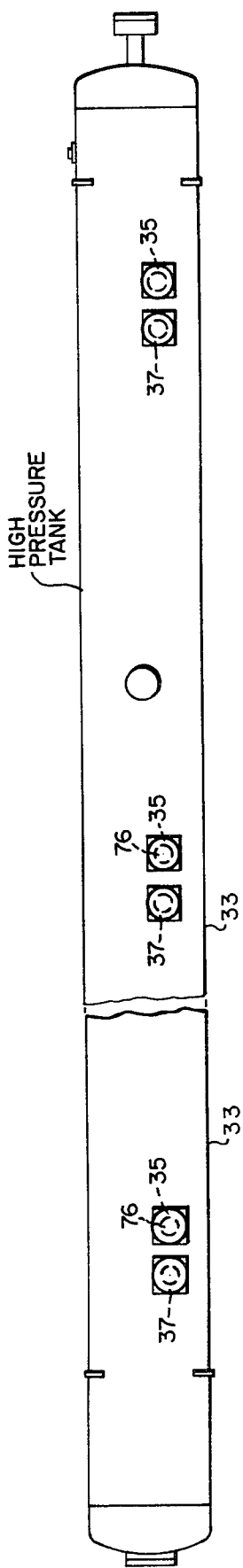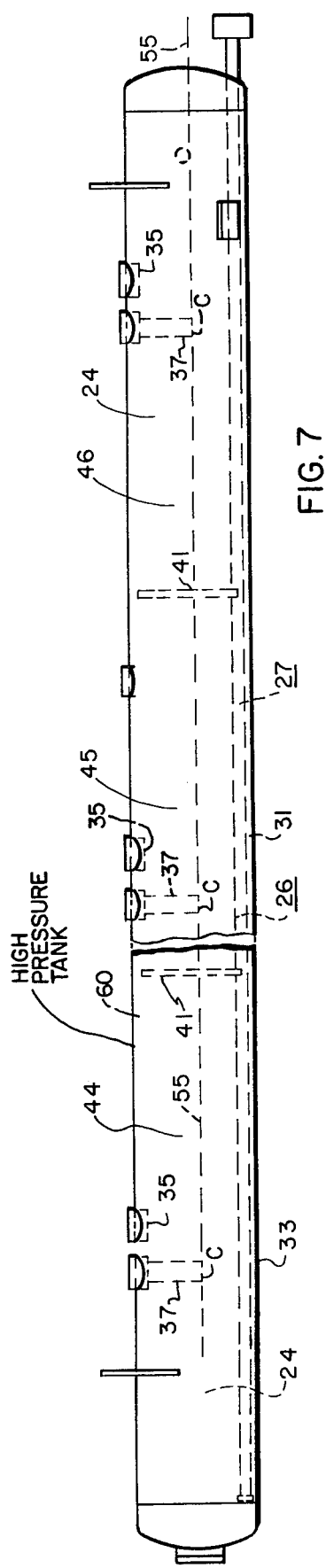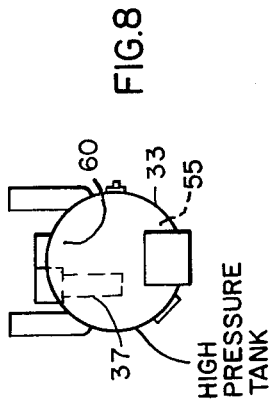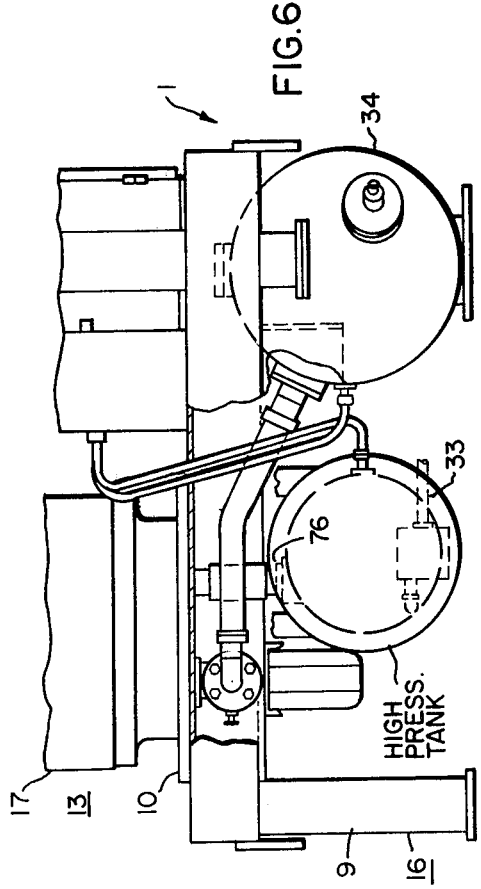

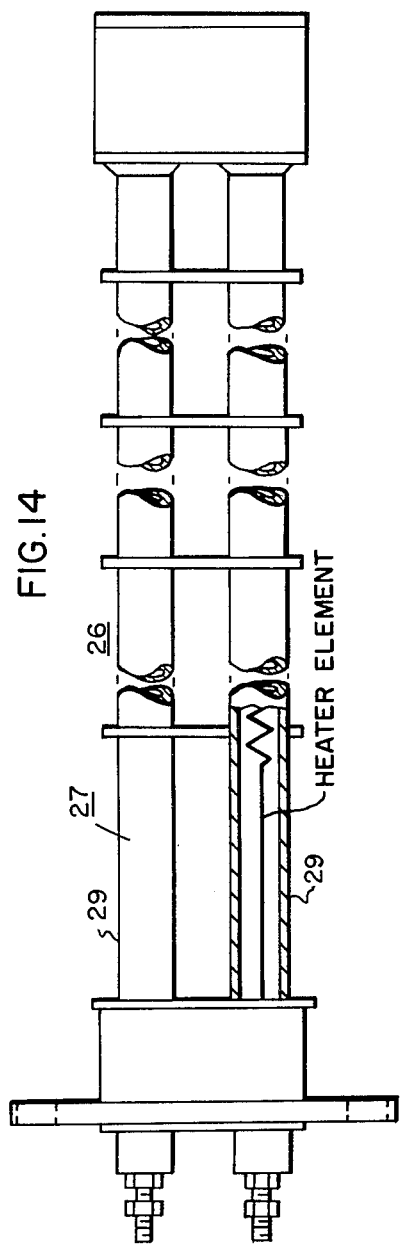
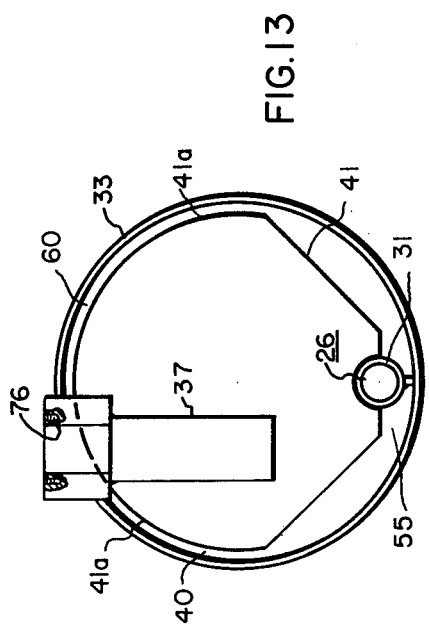
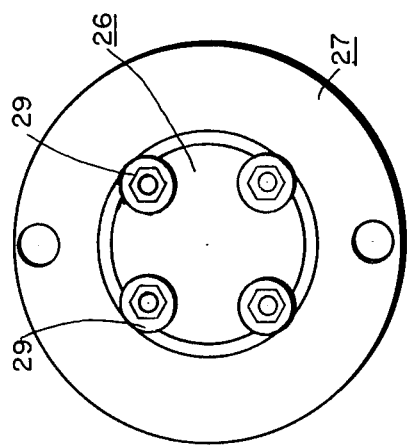

CONVECTION HEATING APPARATUS FOR MULTI-PHASE GAS-TYPE CIRCUIT INTERRUPTERS

CROSS-REFERENCES TO RELATED APPLICATIONS

Applicants are not aware of any related patent applications pertinent to the present invention, but U.S. patent application filed Nov. 27, 1974 Ser. No. 527,929 by Soles et al. relates to the same general type of equipment. Also see U.S. patent application filed Nov. 19, 1974, Ser. No. 525,124 by LeRoy et al. and application filed Nov. 27, 1974, Ser. No. 527,930 by LeRoy et al. for additional information on the general type of equipment involved.

BACKGROUND OF THE INVENTION

In recent years there has come about a demand for a reduced-size substation, and this demand, on the part of public utilities, has been met by gas-insulated substation equipment, such as set forth in U.S. Patent nos. 3,378,731 — Whitehead; 3,348,001 — Upton et al. 3,801,768 — Meyer; 3,794,797 — Spindle et al.; 3,356,798 — McKinnon; 3,610,858 — Gruber et al.; 3,599,041 — Boersma et al.; and 3,562,460 — Koener.

The foregoing equipment significantly reduces the space required by the high-voltage side of substations rated, for example, 115 K.V. through 345 K.V. The space reduction is accomplished by replacing the open bus and air-type terminal bushings with gas-insulated bus, filled, for example, with a highly-insulating gas, such as sulfur hexafluoride ($SF_6$) gas, at a pressure say, for example, of 45 p.s.i.g., and thereby permitting the location of electrical equipment very closely together. This gas-insulated substation equipment has many advantages, among which are:

1. Significant reduction in space requirements both in land area and overall height.
2. Added system reliability by eliminating the possibility of phase-to-phase faults, lightning strokes within the system, or contamination of insulators.
3. Reduced maintenance because the closed system is isolated from its environment.
4. Added personnel safety because all live parts are covered by grounded shields.
5. The gas-insulated modular approach has the additional advantage, because it provides the utility user with lower installation costs, when compared with conventional, or other types of power-transmission systems. The gas-insulated system, as briefly described above, has additional design strategies, inasmuch as the high-voltage power-transmission and control equipment is compressed, so that both the space required, and the total length of bus is minimized. The power transformers may be located on outside corners of the station so as to be capable of ready removal, and the location of cable potheads is flexible, with the result that the system may be readily connected to overhead lines.

As examples of the types of ratings for such gas-insulated transmission systems, reference may be made to the specification ratings, as set forth below:

| | |
|---|---|
| 115/138 k.v. Ratings | |
| General Ratings for MGT Systems | $SF_6$ at 45 psig |
| Rated maximum voltage | 145 |
| Bil | 650 |
| 60 HZ one minute withstand | 310 |
| Chopped wave | Not applicable |
| Symmetrical 3 Second Current Rating | 47 ka |
| Momentary Current | 76 ka |
| Switching Current Ratings | |
| Circuit breaker (maximum rated interrupting current) | 50 ka |
| Magnetizing current switch | 35 amps |
| Isolator | No load switching only |
| Ground switch | No load switching only |
| Continuous Current Ratings | |
| Circuit Breaker | 2,500 Amperes |
| Load-break switch | 2,500 Amperes |
| Magnetizing current switch | 2,500 Amperes |
| Isolator | 2,500 Amperes |
| Ground Switch | Not applicable |
| Bus | 3,000 Amperes |
| 230 k.v. Ratings | |
| General Ratings for MGT Systems | $SF_6$ at 45 p.s.i.g. |
| Rated maximum voltage | 242 |
| BIL | 900 |
| 60 HZ-one minute withstand | 425 |
| Chopped wave | Not applicable |
| Symmetrical 3 Second Current Rating | 47 ka |
| Momentary Current | 76 ka |
| Switching Current Ratings | |
| Circuit-breaker (maximum rated interrupting current) | 50 ka |
| Magnetizing current switch | 35 amps. |
| Isolator | No load switching only |
| Ground switch | No load switching only |
| Continuous Current Ratings | |
| Circuit-breaker | 2,500 Amperes |
| Load-break switch | 2,500 Amperes |
| Magnetizing current switch | 2,500 Amperes |
| Isolator | 2,500 Amperes |
| Ground switch | Not applicable |
| Bus | 3,000 Amperes |
| 345 k.v. Ratings | |
| General Ratings for MGT Systems | $SF_6$ at 45 p.s.i.g. |
| Rated maximum voltage | 362 |
| Bil | 1050 |
| 60 HZ-one minute withstand | 555 |
| Chopped wave | Not applicable |
| Symmetrical 3 Second Current Rating | 47 ka |
| Momentary Current | 76 ka |
| Switching Current Ratings | |
| Circuit-breaker (maximum rated interrupting current) | 50 ka |
| Magnetizing current switch | 35 amps |
| Isolator | No load switching only |
| Ground switch | No load switching only |
| Continuous Current Ratings | |
| Circuit-breaker | 2,500 Amperes |
| Load-break switch | 2,500 Amperes |
| Magnitizing current switch | 2,500 Amperes |
| Isolator | 2,500 Amperes |
| Ground Switch | Not applicable |
| Bus | 3,000 Amperes |

It is desirable to provide an improved heating means for the arc-extinguishing gas, such as sulfur-hexafluoride ($SF_6$) gas; for example, which will, in effect, provide the proper circulation of the heated gas within the circuit-breaker modules.

SUMMARY OF THE INVENTION

In accordance with the present invention there is provided a plurality of baffle plates spaced longitudinally along a unitary high-pressure gas-reservoir tank.

For certain applications, if desired for convenience, the baffle plates may be fixedly attached to the longitudinally extending, generally tube-like heater-well, which may be inserted into the end of the high-pressure reservoir tank as a unitary assembly. Gas circulation is desirably permitted around the edges, or sides of the one or more baffle-plates, and in each section, or chamber there is provided a hot gas inlet pipe into the associated upstanding gas-type circuit-breaker assembly, or module, and a cool gas outlet pipe down out of the circuit-breaker assembly, or module, the cold gas outlet pipe terminating, preferably, at a lower elevational level within the high-pressure gas reservoir tank than the lower termination level of the hot gas inlet pipe.

BRIEF DESCRIPTION OF THE DRAWINGS

FIG. 5 is a side-elevational view of a three-phase gas-type circuit-interrupter installation, illustrating the baffle barrier plates and the high-temperature and cold outlet gas-conducting pipes;

FIG. 6 is a fragmentary end view of the installation of FIG. 5;

FIG. 7 is a detailed side-elevational view of the high-pressure tank structure with the baffle plates disposed therewithin, and showing, generally, the disposition of the lower-disposed heater-well;

FIG. 8 is an end elevational view of the high-pressure tank structure of FIG. 7;

FIG. 9 is a top plan view of the high-pressure tank structure of FIGS. 7 and 8;

FIG. 13 is a vertical sectional view taken through the high-pressure gas reservoir tank of FIGS. 7-9 showing the arrangement of the baffle-plate and the longitudinally extending heater-well assembly disposed therewithin;

FIG. 14 is a side-elevational view of a two-element tank heater; and,

FIG. 15 is an end elevational view of the gas-heater assembly of FIG. 14.

Figure 2:
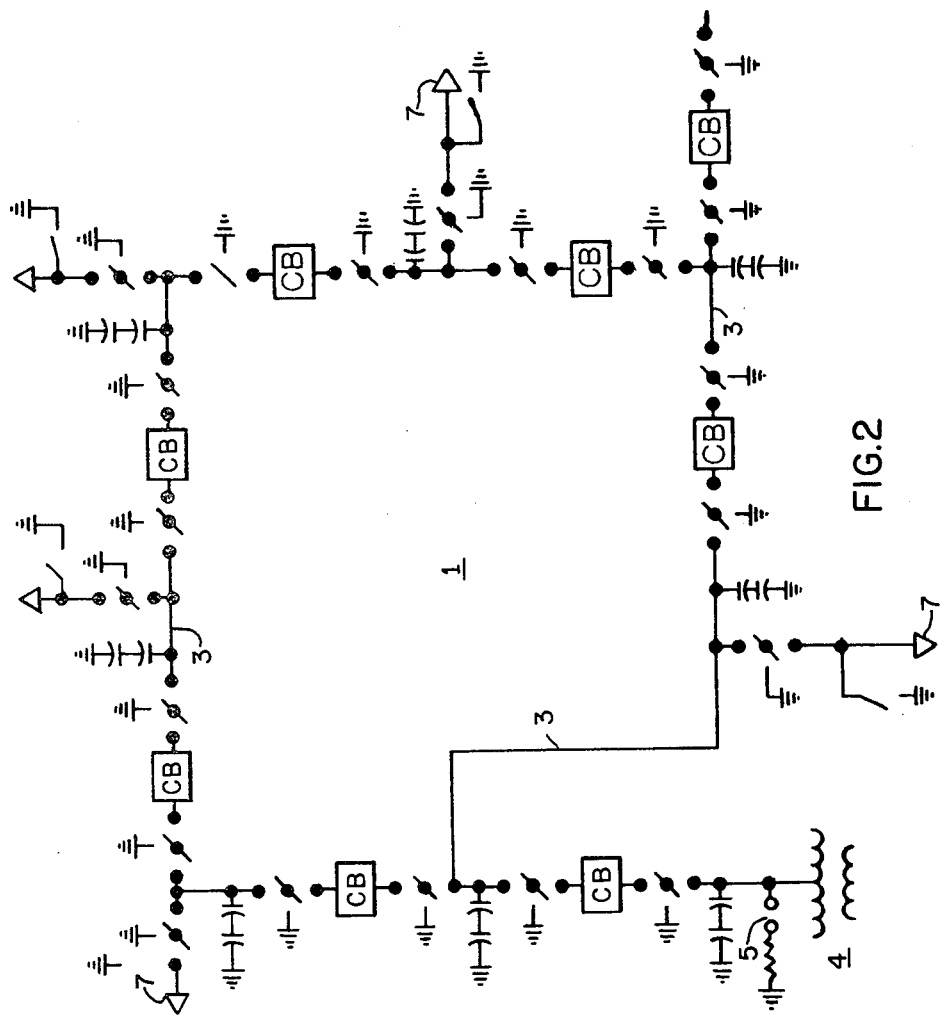
FIG. 2 is a one-line diagram for the gas-insulated substation power-transmission equipment of FIG. 1.
Figure 1:
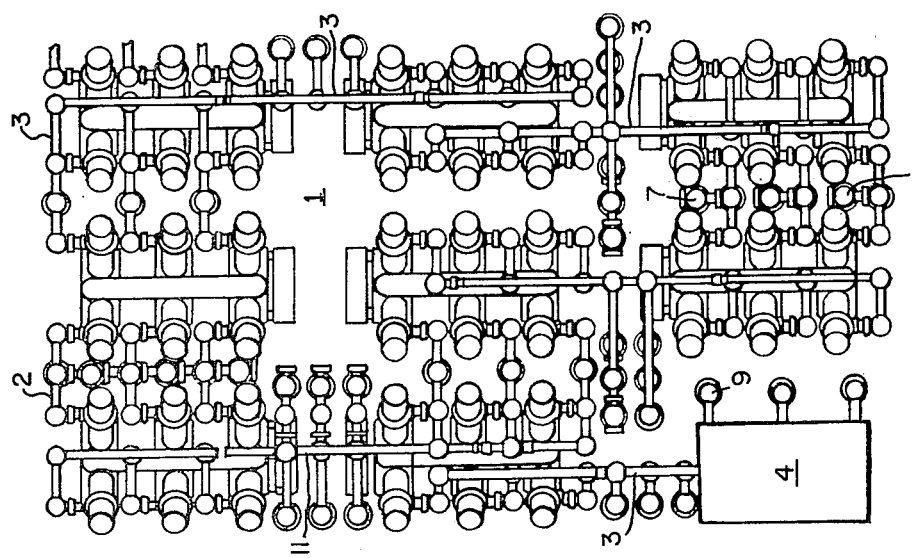
FIG. 1 is a somewhat diagrammatic view of gas-insulated substation equipment, showing the general environment for one application of the improved gas-heating means of the present invention.

The present invention has particular application to a line of equipment 1 involving gas-insulated substations having gas-insulated components, and somewhat diagrammatically illustrated in FIGS. 1 and 2 of the drawings.

FIG. 2 is a one-line diagram of the equipment 1 illustrated in FIG. 1. It will be noted, from a consideration of FIGS. 1 and 2, that the high-voltage equipment 1 is arranged so that both the space required, and the total length of the gas-insulated bus 3 is minimized. The power transformer 4 is located on an outside corner of the station, preferably, so that it can be easily removed. The gas-insulated bus 3 is attached directly to the transformer-bushing minimizing area and height required. The location of the cable pothead is flexible. In the gas-insulated system 1, as illustrated in FIGS. 1 and 2, it is chosen to minimize the length of the $SF_6$ bus 3. If a lightning arrester 5 is located at each pothead 7, an arrester 5 is not required at the power-transformer 4.

It will be noted that the gas-insulated system 1 of FIG. 1 can be connected to overhead lines. However, the air clearances, required by incoming power lines, will somewhat enlarge the total area required by the system 1, and will require additional $SF_6$ bus 3.

The gas-insulated transmission system 1, illustrated in FIG. 1, is a line of equipment, which will significantly reduce the space required by the high-voltage side of substations rated 115 K.V. through 345 K.V. The space reduction is accomplished by replacing the open bus and air terminal-bushings, commonly used, with gas-insulated bus 3 filled with sulfur-hexafluoride ($SF_6$) gas, for example, at 45 p.s.i.g. (at 70° F.), and moving the component parts of the electrical equipment as close together as possible.

The use of gas-insulated transmission systems 1 offers many advantages. The use of the system 1 offers several advantages to the utility user, some of these are:

1. Significant reduction in space requirements both in land area and overall height.
2. Added system reliability by eliminating the possibility of phase-to-phase faults, lightning strokes within the system 1, or contamination of the environment.
3. Reduced maintenance because the closed system 1 is isolated from its environment.
4. Added personnel safety because all live parts are covered by grounded shields.
5. The modular approach was chosen because it could provide the utility user with lower installation costs when compared with conventional or other gas-insulated systems.
6. The system 1 can be overbuilt to permit multiple use of the land.

Generally, the equipment 1 includes a plurality of bus assemblies 3 determined by the length that can generally be shipped. The typical bus length 3 will be, for example, 40 feet, and may consist of two 20-feet lengths, with an epoxy spacer (not shown) in each length. The ends of the bus 3 can be connected to additional lengths of bus 3, or any functional member of the system 1. Expansion joints are located in each 20-foot bus-section 3 to absorb the maximum of 0.4 inches of expansion expected. As stated, sulfur-hexafluoride ($SF_6$) gas at 45 p.s.i.g., for example, fills both the sheath 11 and the bus conductor 3, and is free to move throughout the entire bus. The 45 p.s.i.g. $SF_6$ gas pressure provides approximately the highest dielectric strength possible down to −40° C. without liquefaction, eliminating the need for auxiliary heat. High-pressure $SF_6$ gas, however, does require a heat input at low ambient temperatures, as set forth more fully hereinafter.

Figure 3:
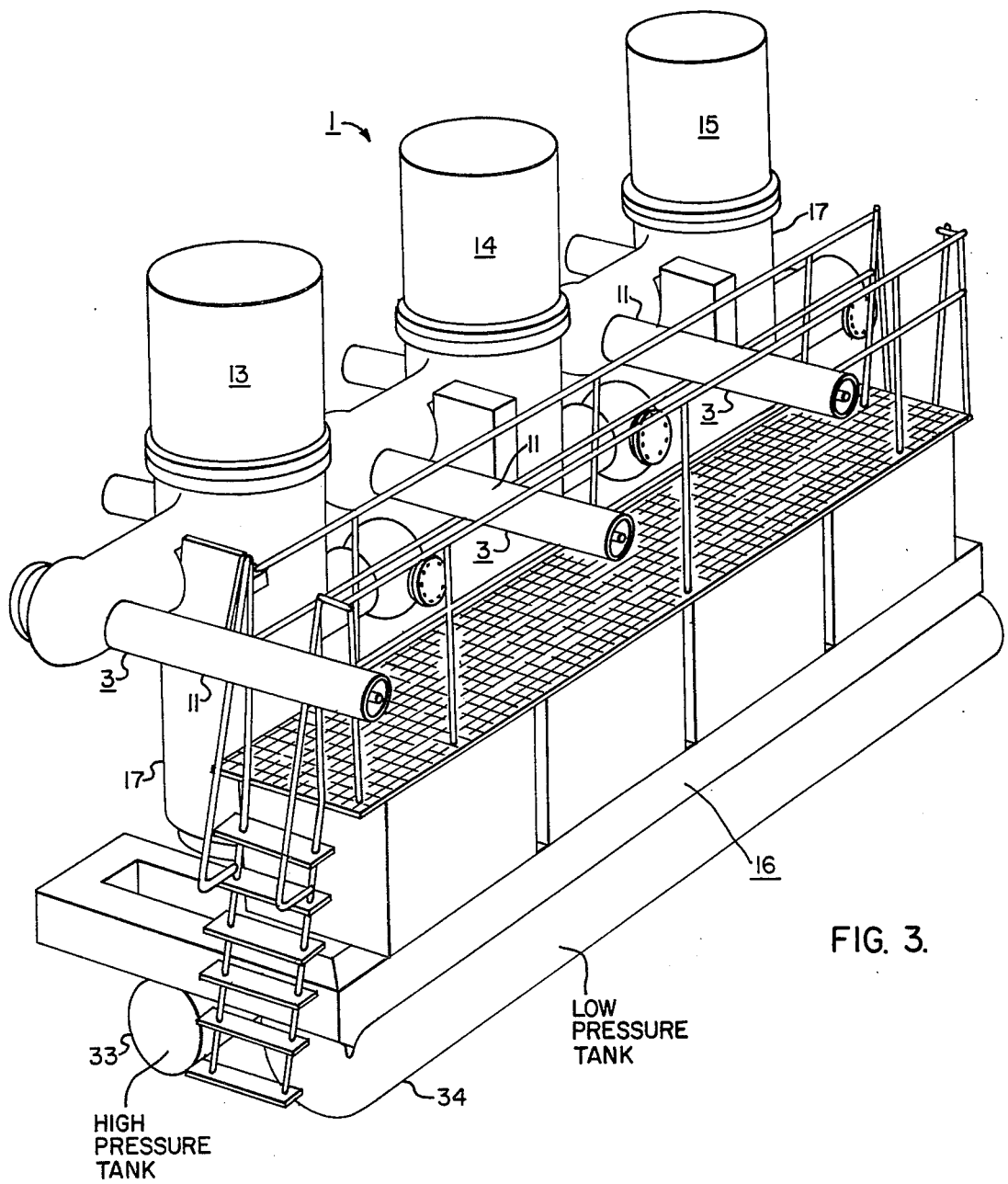
FIG. 3 is a perspective view of a three-phase power circuit-breaker installation illustrating, generally, a three-phase, gas-type circuit-breaker installation with the gas-heating and gas-handling system therefor.
Figure 4:
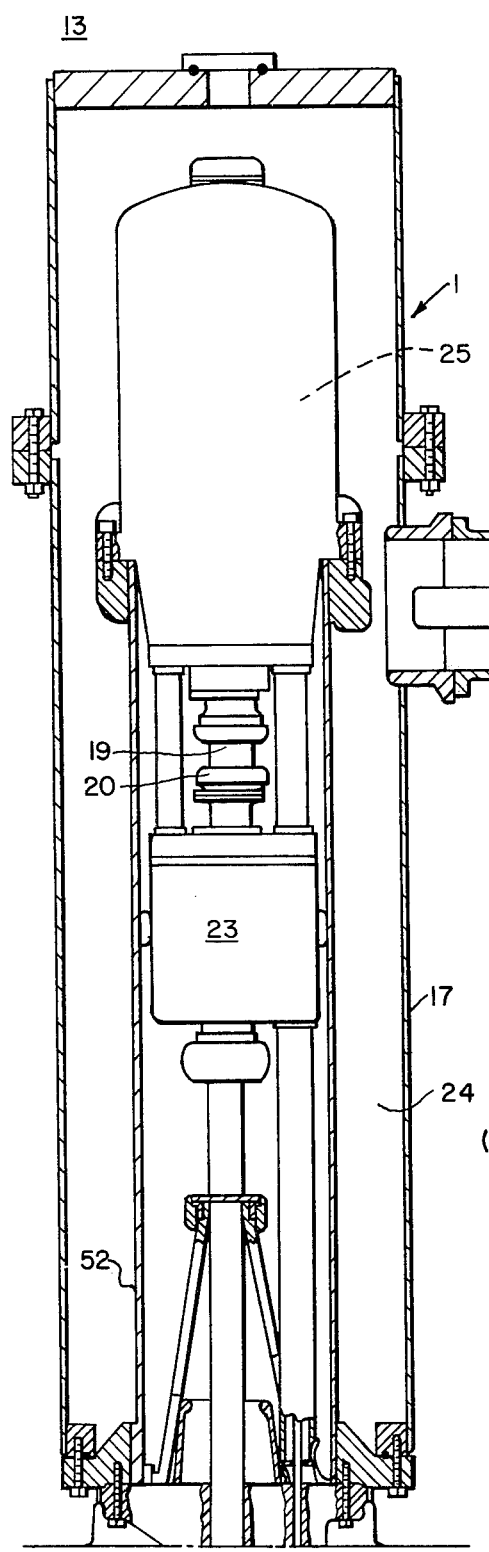
FIG. 4 is a fragmentary vertical sectional view taken through a circuit-breaker casing structure illustrating, generally, the type of gas-type circuit-breaker module involved in each of the three phases, with the upper movable isolator contact in the open-circuit position and the circuit-breaker contacts closed.

With reference to FIG. 3, it will be observed that there are provided three circuit-breaker assemblies, 13, 14 and 15, each including a casing structure 17, as more clearly illustrated in FIG. 4, enclosing separable contacts 19, 20, which are separable to an open position to establish arcing (not shown) and to effect circuit interruption. Reference may be made to the following United States patents for a detailed description of the individual circuit-interrupter modules 13, 14 and 15: U.S. Pat. No. 3,590,189, issued June 29, 1971, U.S. Pat. No. 3,596,028, issued July 27, 1971 — Kane et al., U.S. Pat. No. 3,639,713, issued Feb. 1, 1972 — Fischer et al., U.S. Pat. No. 3,624,329, issued Nov. 30, 1971 — Fischer et al., and U.S. Pat. No. 3,665,133 issued May 23, 1972 — Reese et al.

The circuit-breaker modules 13, 14 or 15 are of high capacity and comprise three phase-units mounted vertically upon a support frame 16. These breaker-modules use sulfur-hexafluoride (SF$_6$) gas 24 for arc-extinction, insulation and operation. The three vertical phase-units are each mounted upon a base-plate 10. These base-plates 10 are supported by a boxed-in angle-type frame 16. This frame 16 is supported on one side by rectangular tubing-type legs 9. The low-pressure reservoir 34 serves as a support for the opposite side. Located on one side of the breaker-module is the low-pressure gas-reservoir tank 34 containing SF$_6$ gas 24. This reservoir tank has a dual function. During normal breaker operation, it contains sulfur-hexafluoride gas at a nominal pressure of 5 p.s.i.g., and also provides a main support for one side of the breaker 1. This reservoir 34 is an ASME coded vessel. It has a relief valve attached to it and set at 150 p.s.i.g. It has a relief valve attached to it and set at 150 p.s.i.g.

The high-pressure reservoir tank 33 is located beneath the phase-units, or circuit-breaker modules 13, 14 and 15, and provides an adequate high-pressure gas supply. The reservoir tank 33 contains a heater 26, and heating of each interrupter module 13, 14 or 15 is by convection through two feed pipes 35, 37 from this reservoir 33. This reservoir 33 is ASME coded.

A compact weather-proof mechanism housing 21, is located between two phase-units 13 and 14. This housing 21 contains the operating mechanism and associated auxiliary switches, which provide closing and tripping control for the breaker 1. The interrupter columns consist of an interrupter-module 23 (FIG. 4) housed within a grounded tank 17, and an operator at the top of the respective column 13, 14 or 15 as shown in FIG. 4. The interrupter 23 (FIG. 4) is located in sulfur-hexafluoride gas 24 at a nominal 245 p.s.i.g.

The interrupter is arranged with the contacts 19,20 surrounded by high-pressure SF$_6$ gas to give a minimum arcing time. On an opening operation, the operator 25 moves the movable interrupter contact 19 upwardly. As contact motion starts, the gas seal is broken to permit high-pressure SF$_6$ gas, surrounding the contacts 19, 20, to start to flow through the hollow contact assembly. Contact overlap permits the moving contact 19 to attain the desired velocity and gas flow before contact part. Upon contact part, the arc is initially drawn between the stationary contact fingers 20 and the moving contact tip 19. Gas flow quickly transfers this arc to the arc tips resulting in a long arc, that is cooled and deionized at current zero by the flow of high-pressure SF$_6$ gas. Near the end of the moving contact travel, a blast-valve (not shown) is actuated to close and to seal off the gas flow leaving the opened contacts 19, 20 in an atomsphere of high-pressure SF$_6$ gas 24. The total interrupting time from trip-coil energization to arc interruption is two cycles, or less.

The breaker 1 uses high-pressure gas (240 p.s.i.g.) for primary insulation to ground, insulation across the open contacts 19, 20 pressure differential for gas flow to the 5 p.s.i.g. system during arc interruption, and energy for breaker operation. SF$_6$ gas is used at an intermediate pressure of 45 p.s.i.g. for high dielectric strength in the area immediately inside the grounded tank assembly 17. There is no SF$_6$ circulation between this insulation system and the other two pressure systems.

Sulfur-hexafluoride gas in a pure state is inert and exhibits exceptional thermal stability. It has excellent arc-quenching properties. These characteristics, combined with its exceptionally good insulating properties, make it an excellent medium for use in circuit-breakers.

Since the pressure-temperature characteristics of SF$_6$ gas may cause it to liquefy at 220 p.s.i.g. and 48° F., it is necessary to provide heat in the high-pressure gas at temperatures below 48° F. Heat is supplied by a double-element heater assembly 27 disposed in the high-pressure reservoir 33. The heaters 29 themselves (FIG. 14) are automatically controlled by thermostats. Where required, pressure switches in the high-pressure system 33 are temperature-compensated.

When the circuit-breaker 1 operates, it discharges gas from the high-pressure side to the low-pressure side, and raises the pressure in the low-pressure side. The low-pressure governor switch actuates at 11 p.s.i.g. and completes the circuit of the line starter coil to close the line-starter, energizing the compressor motor, and pumping the gas from the low-pressure side 34 to the high-pressure side 33. After normal low pressure is reached (5 p.s.i.g.) a low-pressure governor switch opens to de-energize the line-starter and stop the compressor.

As mentioned, briefly, during the opening operation of each interrupter module 13, 14 or 15, the upper movable contact 19 moves upwardly away from the lower stationary contact 20, as illustrated in FIG. 4, establishing an arc therebetween (not shown), and effecting circuit interruption. Where desired, a movable isolator contact 22 (FIG. 4) may be moved to the open and closed-circuit positions by suitable mechanism, constituting no part of the present invention, and the details of which may be gleaned from a study of U.S. Pat. No. 3,700,840 — Wilson, and U.S. Pat. No. 3,694,592 — Kuhn.

Preferably a highly insulating gas 24, such as sulfur-hexafluoride (SF$_6$) gas, is utilized throughout the gas system, through the gas-insulated piping 3, and also within the circuit-interrupter modules 13, 14 and 15, as illustrated in FIG. 4. When such a suitable insulating gas 24 is utilized, it has a relatively low liquefaction point, and it is, therefore, desirable during low-temperature ambient conditions, to provide heating means 26 for the high-pressure gas 24, which otherwise would tend to liquefy at a temperature, say of 10° C., for example. Such installations, as well known to those skilled in the art, may be in outside locations, and during the winter months, or in certan geographical areas, such as Canada, for instance, may encounter low ambient temperature conditions, Thus, the heating means 26 is provided, and in this particular instance, a heating-rod element 29 extends longitudinally in air almost the entire axial length of the heater-well tube 31, as shown in FIG. 14. The temperature of the heater-well tube 31 may approach, for instance, 150° C., for example. On the outside of the air-filled heater-well tube 31 the heat is conveyed by convection to the sulfur-hexafluoride (SF$_6$) gas 24, for example, in contact with the external surface of the air-filled heater-well tube 31, and this will maintain the gas 24 in the high-pressure reservoir tank 33 at a suitable high-temperature level, thus avoiding liquefaction.

To provide the flow of high-pressure gas 24 upwardly into the three circuit-breaker modules 13, 14 and 15, a high-temperature inlet pipe 35 is provided for each module 13, 14 or 15, which terminates at the upper portion 60 of the high-pressure reservoir tank 33, as shown more clearly in FIGS. 5 and 7.

The cold gas return 37, however, extends to a lower level 55, as also shown more clearly in FIGS. 7 and 8. Thus, encouragement is provided for the proper gas circulation of heated gas 24 throughout the respective circuit-breaker module 13, 14 or 15, which would not otherwise occur if both conduit pipes 35, 37 were at the same elevational level within the tank 33.

With reference to FIG. 13, it will be observed that there is provided clearance 40 (FIG. 13) around the edges 41a of the baffles 41, and that although the metallic baffle plates 41 tend to compartmentalize the longitudinally extending high-pressure reservoir tank 33 into sections 44, 45 and 46, nevertheless there is provided adequate clearance 40 along the metallic baffles 41, as shown in FIG. 13, to permit the high-pressure gas 24 to flow freely lengthwise of the longitudinally extending high-pressure reservoir tank 33. It is to be noted that actually clearance 40 is needed only at the bottom of the tank 33. The top may well be tight, if desired.

From the foregoing description it will be apparent that the present invention offers an arrangement of a high-pressure reservoir tank 33 to give uniform heat flow to the gas 24 supplied in each column 13, 14 or 15 of each of the three-phase circuit-interrupter assemblies. To make a tank 33 of three separate closed sections would be very expensive, and also to have three separate reservoir tanks and heaters would also, obviously, be too expensive. Thus, the barrier-plate design 41, as set forth in FIGS. 7 and 13, offers a simple and effective method of equal heat distribution in the high-pressure reservoir tank 33 to each of the three upstanding circuit-breaker column structures 13, 14 and 15.

Figure 12:
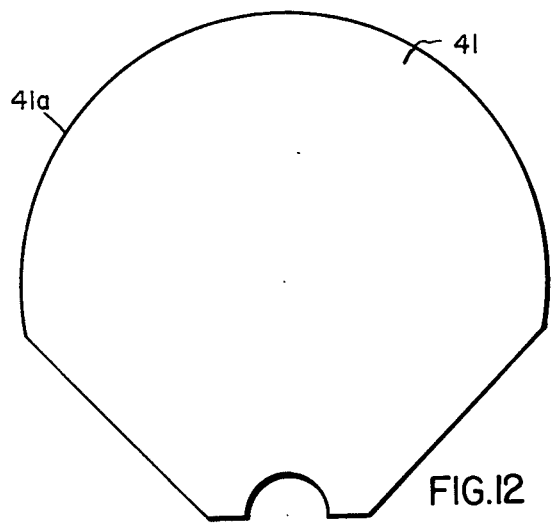
FIG. 12 is a detailed view of a single metallic baffle-plate.

Preferably, two of the three barriers 41 (FIG. 12) are welded to the heat-well pipe 31, (FIG. 10) and are inserted with the heater 26 within the high-pressure reservoir tank 33 as a unitary assembly, as shown in FIG. 7. This installation of the heater-pipe 31 and two baffles 41 takes place before the assembly of the un-insulated cold gas return pipe line 37 into the high-pressure tank 33 from each of the three upstanding circuit-breaker modules 13, 14 and 15.

FIGS. 7-9 show the high-pressure reservoir tank 33 with the metallic barriers 41 located therealong, and also the hot gas lines 35 and the cold gas return lines 37 to each of the three upstanding circuit-breaker modules 13, 14 and 15, reference being had in this regard to FIG. 5 of the drawings.

The gas-type circuit-interrupting assemblage 1 for use in gas-insulated substations is of multi-phase type and designed with heating requirements adaptable for the high-pressure $SF_6$ gas 24 for each phase of the three-phase interrupting assemblage 1. It is, therefore, necessary to have uniform heating in all phases of the circuit-breaker. As mentioned, to make three separate tanks, with separate heaters and controls, is obviously complex and very costly. To make a single tank for heating and supplying the high-pressure gas to all the phases is a less-costly design; however, the single tank does not lend itself to uniform heating in the separate phases.

Accordingly, the present invention provides an improved construction of the high-pressure storage and heating tank 33, offering the lower cost of a single-tank design, with the uniform heating capability of a separate tank design.

Figure 10:
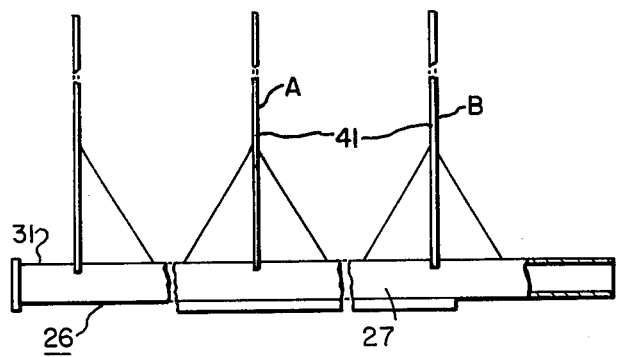
FIG. 10 shows a side-elevational view of the heater-well assembly and the metallic baffle-barriers attached thereto to facilitate assembly.
Figure 11:
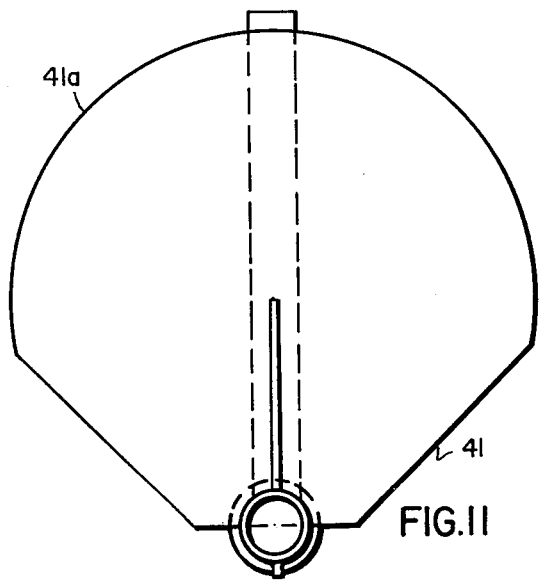
FIG. 11 is an enlarged end elevational view of the heater-well and baffle-plate assembly of FIG. 10.

The barriers 41, shown in FIGS. 10 and 11, offer, therefore, a simple and effective way of accomplishing equal heat distribution from the high-pressure tank 33 to each interrupting column. The two barriers located at A and B (FIG. 10) are welded to the heater pipe 31, and are inserted with the heater pipe 31 before assembly of the cold gas-return lines at "C" (FIG. 5) into the high-pressure gas-reservoir tank 33. These barriers 41 in essence, divide the tank 33 into three separate heating chambers. There intentionally is communication of gas between the chambers 44-46 (FIG. 7) to maintain equal pressure due to the barriers 41 not being completely welded in place.

A single-tank heater 27 (FIG. 14) may then be utilized projecting through the barriers 41 with an equal effective heating length in each chamber 44. The heater may be a single-element heater 29, or a multiple-element heater, as desired.

The present invention shows a construction which distributes equal amounts of heat into the gas of each chamber 44-46, thereby maintaining equal temperatures. The hot gas rises to the top of the chamber 44-46 where an opening 76 (FIG. 13) to a vertically rising, thermally insulated convection pipe carries the gas into the lower end of the particular interrupting column 13, 14, or 15. The hot gas rises upwardly within the column 13, 14 or 15 and displaces the cooler gas which has collected in the bottom portion of the respective column. This cool gas is transported through a vertically descending, un-insulated cold gas-return line 37 back into the heating chamber.

In order for the heating chamber 33 and the convection process to function properly, the thermally insulated hot gas convection pipe 35 is connected to the extreme top of the heating chamber 33, as at 76. The cold gas return line 37 projects through the wall of the heating chamber 33 to the lower portion 55 (FIG. 13) of the chamber 33, thereby preventing "clogging" of the convection flow.

Temperature control for the heating system 26 can be accommodated by locating the control at the appropriate position in the system. For efficiency of heating, the single heating tank 33 should be thermally insulated.

It will be obvious to those skilled in the art that the present invention is not limited to a specific number of heating chambers 33. The invention may be applied to the heating of any liquid, or gaseous media which the tank 33 may contain. It may also be utilized on other types of gas, or air circuit-breakers, or on other types of related equipment.

With reference to FIG. 5 of the drawings, the arrows 58 generally indicate the flow of the gas 24 circulating upwardly through the hot gas chimneys 35, through the interior of the upstanding circuit-breaker casing 52 (FIG. 4), and the cold gas return flowing downwardly through the cold gas pipe return 37 into the lower portion 55 (FIG. 13) of the longitudinally-extending high-pressure reservoir tank 33. Within each of the three sections 44, 45 and 46, it will be observed with reference to the arrows 58, that gas flow 24 circulates along the lower portion 55 of the tank 33 into contact with the heater-well 31, and after becoming heated, tends to flow upwardly toward the upper portion 60 (FIG. 13) of the tank 33 within the three compartmentalized sections 44-46.

It is to be noted that the number of compartments, or chambers 44-46 may be any reasonable number, the drawing indicating only three in number, because there is needed in the three-phase construction 1 illustrated, for example in the drawings, just three circuit-interrupting modules 13, 14 and 15. For additional modules, additional compartments, or chambers 44-46 could, of course be provided.

In addition, it is to be noted that separate heaters could be used for each compartment, or chamber, if required, or desired, but it is, of course, more economical and beneficial from an operational standpoint to utilize, as illustrated in the drawings, only one heater 27.

Moreover, it is to be observed that the heater-well 31, although illustrated and described as "air-filled," so that the heater element 29 may be easily replaced if it fails, the heater-well 31 could conceivably be filled with some other media possibly to enhance heat transfer. This invention, of course, may be used in other than circuit-breaker installations. It can also be used in liquid systems.

Although there has been illustrated and described a specific embodiment of the invention, it is to be clearly understood that the same was merely for the purpose of illustration, and that changes and modifications may readily be made therein by those skilled in the art, without departing from the spirit and scope of the invention.

We claim:

1. The combination in a three-phase compressed-gas circuit-breaker installation of a longitudinally extending high-pressure reservoir tank, three circuit-breaker modules extending upwardly and supported by said high-pressure reservoir tank in spaced-apart relationship as viewed londitudinally of said tank, a pair of transversely extending metallic baffle-plates spaced apart within said high-pressure tank forming three sectionalized compartments, a longitudinally extending heater-well extending longitudinally at the lower portion of said high-pressure reservoir tank and comprising an air-filled generally tubular structure having a heater-element disposed therewithin, a high-temperature pipe and a low-temperature pipe extending from each of the three sections of said high-pressure reservoir tank upwardly into the respective circuit-breaker module, the low-temperature pipe extending downwardly toward the lower portion of the high-pressure reservoir chamber at a lower elevational level than the termination point for the high-temperature pipe, whereby initial circulation of the heated gas will take place in the proper direction, that is upwardly through the higher-disposed high-temperature pipe through the circuit-breaker module and downwardly through the cool low-temperature pipe terminating at the lower elevational level.

2. The combination according to claim 1, wherein the metallic transversely disposed baffle-plates are fixedly secured to the heater-well and are assembled therewith into the hollow interior of the high-pressure reservoir tank.

3. A multi-phase compressed-gas circuit-breaker installation comprising, in combination, a longitudinally extending high-pressure reservoir-tank having one or more baffles disposed tranversely therein to define at least a pair of adjoining heating compartments, means for heating the gas disposed within said longitudinally extending high-pressure reservoir-tank, at least a pair of compressed-gas circuit-breaker modules extending upwardly from said high-pressure reservoir-tank, high-temperature and low-temperature pipes extending from said reservoir-tank upwardly into each respective circuit-breaker module, the high-temperature and low-temperature pipes terminating at unequal levels within the high-pressure reservoir-tank with the low-temperature pipe extending farther downwardly into the lower portion of the high-pressure reservoir-tank than the high-temperature pipe, the latter terminating at an upper elevational level for encouraging the initial circulation of gas within the heating compartment and upwardly into the circuit-breaker module.

4. The combination according to claim 3, wherein the one or more baffles are of metallic plate-like material.

5. The combination according to claim 3, wherein a clearance space is provided around the outer periphery of each of the one or more baffles to provide the general circulation of high-pressure gas within the longitudinally extending high-pressure reservoir-tank.

6. The combination according to claim 3, wherein a longitudinally extending heater-tube extends longitudinally of the high-pressure reservoir-tank and is disposed adjacent the lower portion thereof.

7. The combination according to claim 6, wherein the heater-tube is air-filled and has at least one longitudinally extending heater-element therein.

* * * * *